United States Patent [19]

Crill et al.

[11] Patent Number: 4,908,776

[45] Date of Patent: Mar. 13, 1990

[54] SPACECRAFT FUEL MEASUREMENT

[75] Inventors: Philip D. Crill, Los Altos; Igor P. Leliakov, Sunnyvale, both of Calif.

[73] Assignee: Ford Aerospace & Communications Corporation, Newport Beach, Calif.

[21] Appl. No.: 123,732

[22] Filed: Nov. 23, 1987

[51] Int. Cl.$^4$ ............................................. G01F 23/22
[52] U.S. Cl. ................................. 364/509; 73/290 R; 73/290 V; 340/618
[58] Field of Search ................ 364/509, 564; 340/618, 340/612, 615, 621; 73/290 V, 291, 290 R

[56] References Cited

U.S. PATENT DOCUMENTS

| | | | |
|---|---|---|---|
| 3,389,602 | 6/1968 | Clemens | 244/135 |
| 4,480,468 | 11/1984 | Sinha | 73/290 V |
| 4,494,210 | 1/1985 | Miller | 364/567 |
| 4,531,405 | 7/1985 | Leister | 73/290 V |
| 4,591,117 | 5/1986 | Scott | 244/170 |
| 4,601,200 | 7/1986 | Stoffelen | 73/290 V |

FOREIGN PATENT DOCUMENTS

| | | | |
|---|---|---|---|
| 3008152 | 9/1981 | Fed. Rep. of Germany | 73/290 R |
| 0008412 | 1/1982 | Japan | 73/290 R |

Primary Examiner—Parshotam S. Lall
Assistant Examiner—S. A. Melnick
Attorney, Agent, or Firm—Edward J. Radlo; Keith L. Zerschling

[57] ABSTRACT

A three-axis accelerometer (4) mounted on board a spacecraft (10) proximate a fuel tank (3) is used to derive an estimate of the amount of fuel (2) remaining within the tank (3). The output of the accelerometer (4) is converted (at 7) to a signal representing the rate of change of the polarity of the acceleration; amplitude information is ignored. This signal is then filtered by bandpass filter (8) or Fourier transform means and applied against an empirically derived function (stored within storage medium 9) relating frequency of oscillation to fuel (2) remaining in the tank (3). The function is stored for three axes; information from one axis is accessed, corresponding to the vector of a perturbing force such as caused by a thruster (11) firing. Some or all of the above described items can be located on board the spacecraft (10) itself. The accelerometer (4) can also be used directly to estimate the force imparted by the thruster, from the expression $F=MA$. This force is then related, by empirical data, to amount of fuel used during thruster (11) firing, which, when subtracted from an initial amount of fuel (2), provides a second check on the amount of fuel (2) remaining in the tank (3).

7 Claims, 3 Drawing Sheets

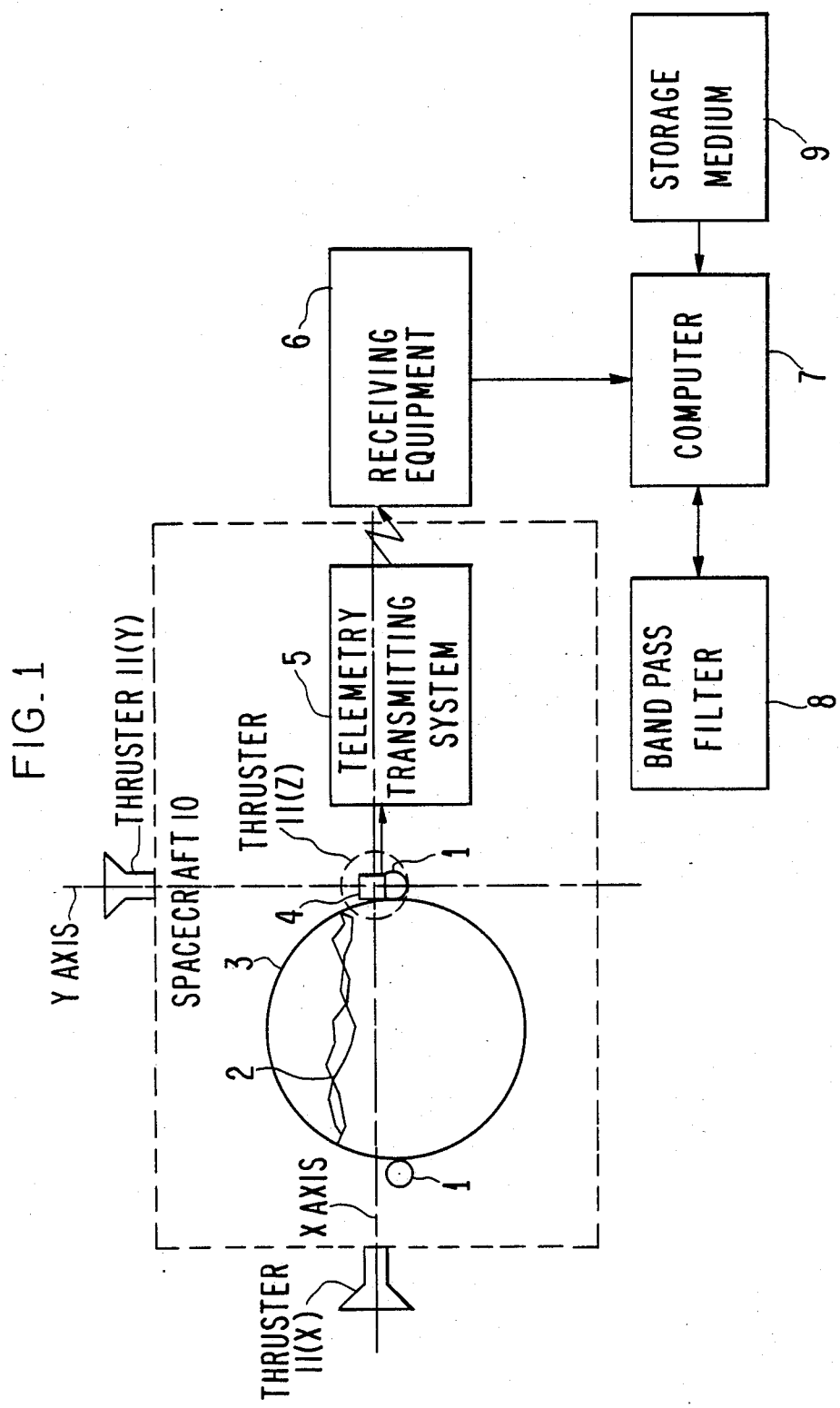

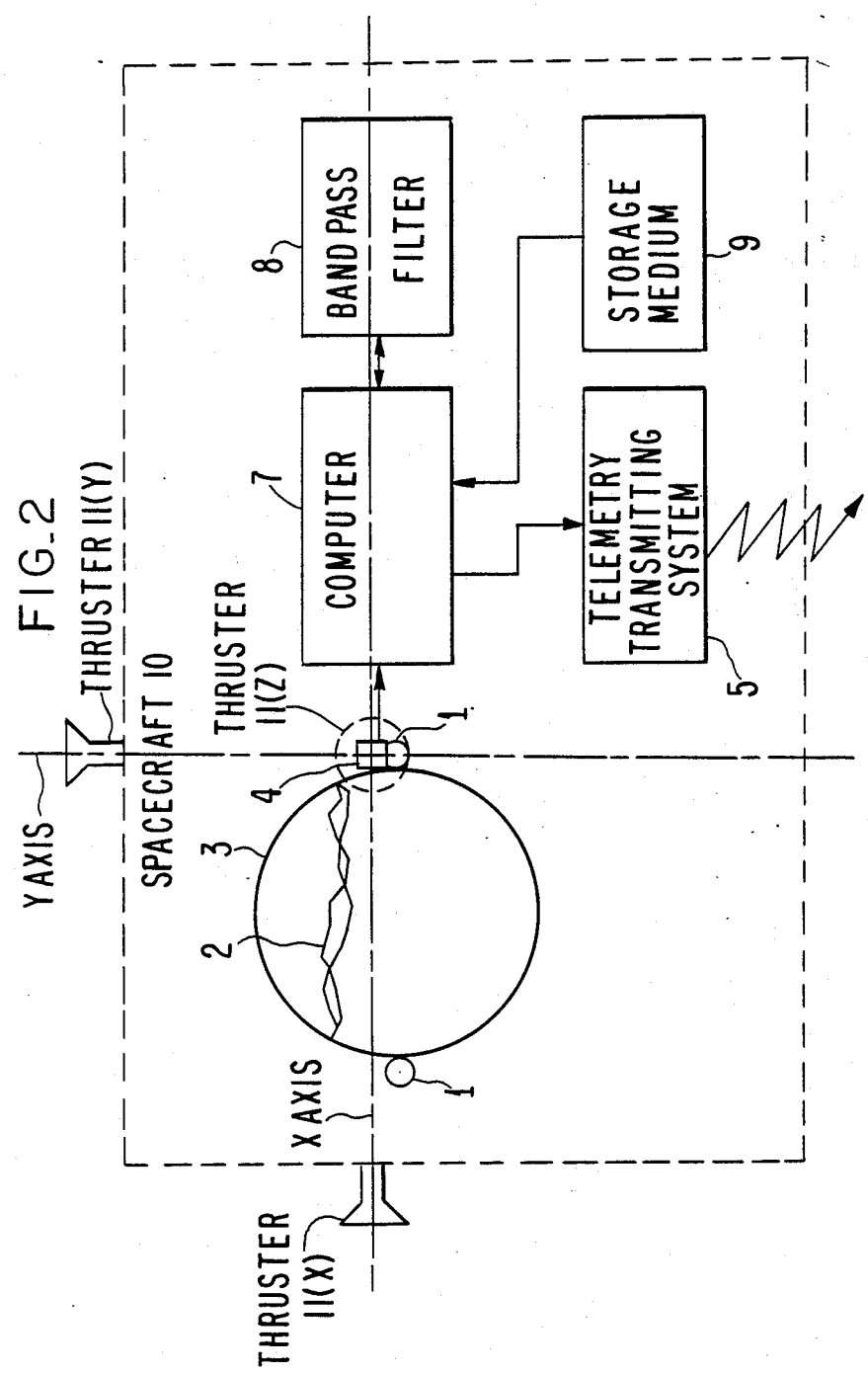

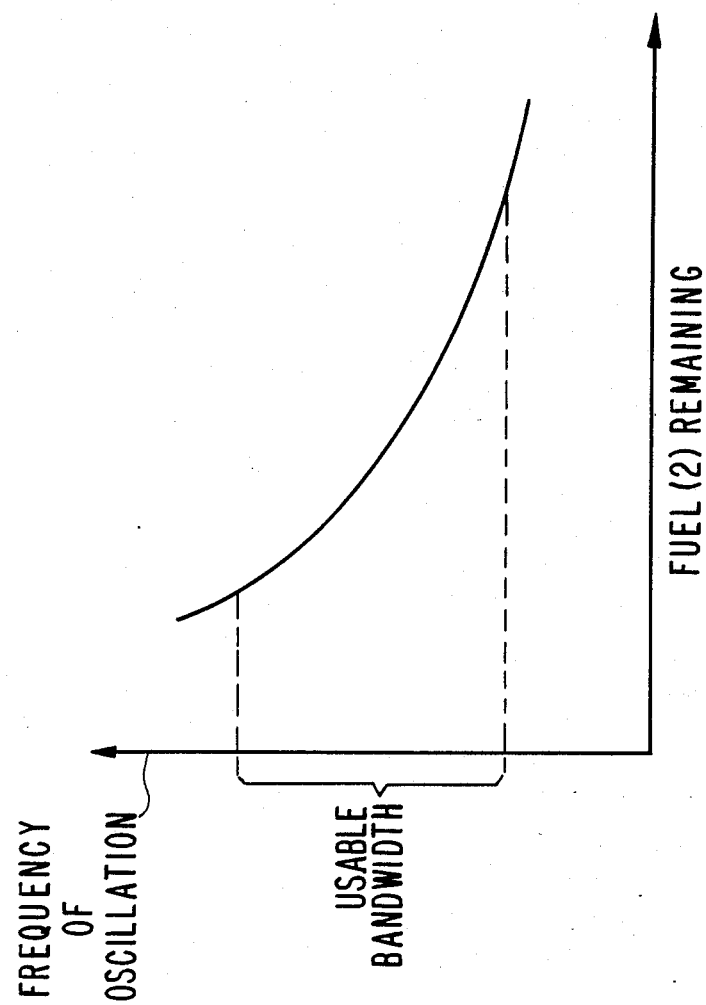

SPACECRAFT FUEL MEASUREMENT

TECHNICAL FIELD

This invention pertains to the field of measuring the liquid fuel remaining in a tank on board a spacecraft.

BACKGROUND ART

U.S. Pat. No. 3,389,602 discloses a spacecraft fuel gauging system using capacitive, sound, or radiation probes in conjunction with capillary baffles within a fuel tank in a zero gravity environment to measure the fuel remaining in the tank. In all cases, the probes are in contact with the fuel, and sense wires must be brought out through the fuel tank pressure wall to connect with external instrumentation.

In the present invention, on the other hand, no sensor is in contact with the fuel. Since the sensor 4 is external to the fuel tank 3, no penetration of the pressure vessel 3 is required. Capillary baffles may or may not be present within the tank 3. Adding the present invention to an existing system does not require any changes in the fuel tank 3 or spacecraft propulsion system which uses the fuel 2 contained therein.

U.S. Pat. No. 4,531,405 discloses a method for measuring the level of radioactive fuel within a container, wherein a tube is inserted into the container. The fuel is made to oscillate by applying pressure via the tube. The frequency of oscillation is measured by a pressure detector and an accompanying computer, which converts this information to volume of fuel in the tank. The tube is required as part of the sensing system.

In the present invention, on the other hand, there is no tube or any other device in contact with the liquid fuel 2 within the fuel tank 3. The fuel 2 sloshes when a spacecraft thruster 11 is fired. Accelerations caused by the sloshing fuel 2 are detected by an accelerometer 4 and converted to frequency of oscillations.

U.S. Pat. No. 4,591,117 discloses a system to counteract the nutation of a spin stabilized spacecraft. Said nutation can be caused in part by fuel slosh. An accelerometer is used to measure the nutation on the satellite. However, the accelerometer is not used to measure frequency of oscillation of the fuel within the tank as in the present invention.

In other prior art techniques, the fuel remaining in a spacecraft fuel tank is calculated by counting thruster firings, and by using ground-derived data estimating the fuel that is used for each firing.

DISCLOSURE OF INVENTION

The present invention is a method and apparatus for determining the amount of liquid fuel (2) within a fuel tank (3) on board a spacecraft (10). An accelerometer (4) is mounted proximate the tank (3). The liquid fuel (2) sloshes within the tank (3) in response to a thruster (11) firing or another perturbation acting on the spacecraft (10). Accelerations caused by the sloshing fuel (2) are measured by the accelerometer (4), and are converted (by 7) into a frequency of oscillation. The actual amount of fuel (2) remaining with the tank (3) is then estimated (by 7) by comparing the measured frequency of oscillation with empirical data (from 9) linking this frequency of oscillation with amount of remaining fuel (2).

BRIEF DESCRIPTION OF THE DRAWINGS

These and other more detailed and specific objects and features of the present invention are more fully disclosed in the following specification, reference being had to the accompanying drawings, in which:

FIG. 1 is a partially schematic, partially block, diagram of a first embodiment of the present invention;

FIG. 2 is partially schematic, partially block, diagram of a second embodiment of the present invention; and FIG. 3 is an example of an empirically generated curve linking frequency of oscillation of sloshing fuel 2 with amount of fuel 2 remaining in the tank 3.

BEST MODE FOR CARRYING OUT THE INVENTION

It is often desirable to have an accurate estimate of the amount of liquid fuel 2 remaining in a fuel tank 3 on board a spacecraft 10. For example, in the case where spacecraft 10 is a satellite in the geosynchronous arc, the satellite needs to be moved out of its geosynchronous position before being decommissioned. The useful life of the satellite 10 can be increased if the amount of fuel 2 remaining in the tank 3 is known. Special techniques must be employed to measure the amount of remaining fuel 2, in view of the zero gravity environment. The present invention improves the estimation of the amount of remaining fuel 2 compared with the prior art.

The liquid fuel 2 (or fuel from other sources) is used to activate thrusters 11 which are positioned about the periphery of the spacecraft 10. The thrusters 11 accomplish such tasks as desaturating momentum wheels (in the case of three-axis stabilized satellites 10) and performing change in velocity maneuvers such as those associated with stationkeeping (for both three-axis and spin-stabilized satellites 10).

The thrusters 11 are typically aligned along each of three orthogonal axes X, Y, Z on the outside periphery of the spacecraft 10. When one of the thrusters 11 is fired for any purpose, the spacecraft 10 moves along the corresponding axis. This movement causes the liquid fuel 2 to slosh within tank 3.

A first embodiment of the invention, in which the remaining fuel 2 is estimated at a remote location, such as a telecommunications station situated on the earth, is illustrated in FIG. 1. A (preferably three-axis) accelerometer 4 is mounted on the outer surface of the fuel tank 3, or on a proximate surface, typically a tank support bracket 1 for reasons of proximity to the sloshing fuel 2 and convenience. Since the accelerometer 4 does not come into contact with the fuel 2, fuel/sensor incompatibility and interference with fuel flow are eliminated.

Accelerometer 4 produces an output signal (typically an analog signal) which is proportional to the acceleration experienced by the accelerometer 4 in each of three orthogonal axes. For purposes of convenience, the three axes of the accelerometer 4 should be aligned with the three thruster line-of-force axes X, Y, Z. The output signal is provoked by firing one of the thrusters 11. This produces vibrations along the corresponding axis. Data for the other two axes is ignored. Amplitude of acceleration can also be ignored, even for the provoked axis, as long as the noise threshold is exceeded. This is because the frequency of oscillation is linked to the amount of remaining fuel 2 by a second order differential equation, while the amplitude of the oscillations is strongly dependent upon the amplitude of the provoking force but only weakly dependent upon the amount of remaining fuel 2.

In the FIG. 1 embodiment, the accelerometer 4 output signal passes through telemetry transmitting system 5 and is then sent to a remote location such as an earth station. Telemetry transmitting system 5 processes the accelerometer 4 output signal into a format that is compatible with other telemetry information being sent by the spacecraft 10. Telemetry transmitting system 5 also comprises a transmitter and an antenna.

The telemetered information is received at the remote location by receiving equipment 6, which typically comprises an antenna and a receiver including a demodulator. The demodulated signal continues to contain information for each of the three orthogonal axes X, Y, Z.

This signal is then passed through computer 7, which determines, for each axis, the rate of change of the direction (polarity) of the acceleration. This can be done, for example, by detecting and clocking the zero crossings of the analog signal from the accelerometer 4. This intermediate signal within computer 7 is thus an analog or digital signal which resembles an alternating current signal, the frequency corresponding to the frequency of oscillations of the fuel 2 sloshing within the tank 3.

There are some unwanted components to this intermediate signal; hence, it is filtered by bandpass filter 8, or by Fourier analysis means contained within computer 7 itself. The nature of the unwanted components is dependent upon the type of spacecraft 10. For a three-axis spacecraft 10, there are unwanted components associated with the vibration of the spacecraft structure that are higher in frequency than for the sloshing fuel 2, and there are unwanted components associated with the vibration of the solar panels that are lower in frequency than for the sloshing fuel 2. For a spin-stabilized spacecraft 10, the unwanted components associated with the spacecraft structure, including any solar panels, tend to be higher in frequency than for the frequency of oscillation of the sloshing fuel 2.

FIG. 3 illustrates an exemplary empirically derived curve linking frequency of oscillation of the sloshing fuel 2 with the amount of remaining fuel 2 in the tank 3. Curves such as these are empirically derived for each of the three orthogonal axes by vibrating the spacecraft 10 on the ground before launch. The actual frequency of oscillation is a function of tank 3 geometry, viscosity of the fuel 2, and pressure in the tank 3.

Not all of the detected frequencies of oscillation are usable, because they may overlap with some of the unwanted components discussed previously. Thus, the usable bandwidth is a subset of the total range of frequencies of oscillation, as depicted in FIG. 3. This usable bandwidth is then used to select the upper and lower frequency limits for bandpass filter 8, or the parameters of the Fourier analysis means.

The functional relationship depicted in FIG. 3 is stored in a storage medium 9. For example, the information may be digitized and stored in a digital read only memory in the form of a lookup table.

The filtered signal for the provoked axis is then applied by computer 7 against the information contained in storage medium 9. If this information is in the form of a digital lookup table, the filtered signal is first passed through an analog to digital converter. The result is the estimate of fuel 2 remaining in the tank 3.

Data from accelerometer 4 can be used in a second method to estimate the amount of remaining fuel 2. In this method, the force imparted by the thruster is estimated from the equation: force = mass × acceleration. The mass is initially measured on the ground before spacecraft 10 launch, and then adjusted based on the amount of fuel consumed by previous thruster 11 firings. The amount of fuel 2 used during the thrusting operation is then calculated based upon empirical ground experiments linking thruster force with fuel consumed. Accumulating these estimates of fuel consumed from all thruster operations and subtracting from the initial amount of fuel 2 in the tank 3 yields a second estimate of remaining fuel 2.

FIG. 2 illustrates an alternative embodiment of the present invention in which the output signal from the accelerometer 4 is first passed through computer 7 on board the spacecraft 10 to arrive at the frequency of oscillation signal, which is then passed through bandpass filter 8 or Fourier analysis means within computer 7 itself as before and applied against the empirically derived function stored within storage medium 9. In this embodiment, items 7, 8, and 9 are all aboard spacecraft 10. The estimate of remaining fuel 2 is then sent by computer 7 to telemetry transmitting system 5, which telemeters it to a remote location.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention. For example, the invention can be used to measure the volume of other types of liquids in tanks on board spacecraft, such as water in a tank on a manned spacecraft.

What is claimed is:

1. Apparatus for determining the amount of liquid fuel remaining in a partially empty fuel tank on board a spacecraft, comprising:

on board the spacecraft proximate the tank, an accelerometer which generates an output signal proportional to measured accelerations along each of three orthogonal axes;

coupled to said accelerometer, means for converting said output signal into an oscillation frequency signal which indicates, for each of the three axes, the frequency at which the polarity of the acceleration changes, said oscillation frequency signal being proportional to the frequency of oscillation of the sloshing fuel for each of the three axes; and coupled to said converting means, storage means containing, for each of said three axes, empirically determined values of frequency of oscillation of the sloshing fuel as a function of fuel remaining in the tank; wherein applying the oscillation frequency signal to the storage means yields an estimate of the remaining fuel.

2. The apparatus of claim 1 further comprising, coupled to the converting means, filter means for filtering out oscillation frequencies not associated with fuel sloshing within the tank.

3. The apparatus of claim 2 wherein the frequency range of the filter means is selected so as not to overlap with unwanted frequencies that are associated with oscillations of structural spacecraft members.

4. The apparatus of claim 1 wherein the output signal of the accelerometer is telemetered from the spacecraft to a remote location; and the converting means and the storage means are situated at the remote location.

5. The apparatus of claim 1 wherein the converting means and the storage means are situated on board the spacecraft, and the estimate of the remaining fuel is telemetered from the spacecraft to a remote location.

6. The apparatus of claim 1 further comprising, on board the spacecraft, at least one thruster aligned along each of the three accelerometer axes, wherein:
one of said thrusters is fired to produce a disturbance force along the corresponding axis; and
acceleration information from said corresponding axis is used to access the storage means, while acceleration information from the other two axes is ignored.

7. A method for determining the amount of liquid fuel remaining in a fuel tank on board a spacecraft, wherein an accelerometer having at least one axis has been mounted on board the spacecraft proximate the fuel tank, said method comprising the steps of:

empirically generating on earth a set of retrievable data which converts frequency of oscillation of fuel sloshing within the tank to amount of fuel remaining within the tank;

after the spacecraft has been launched, imparting a force along an axis of the accelerometer;

in response to said force, obtaining from the accelerometer an output signal proportional to the instantaneous acceleration along said axis;

converting said output signal into an oscillation frequency signal indicating the rate of change of the direction of the instantaneous acceleration along said axis, said oscillation frequency signal being proportional to the frequency of oscillation of the sloshing fuel; and applyig said oscillation frequency signal to a storage medium which contains said set of retrievable data.

* * * * *